US008572280B2

(12) United States Patent
Dussault

(10) Patent No.: US 8,572,280 B2
(45) Date of Patent: Oct. 29, 2013

(54) METHOD AND SYSTEM FOR SERIALIZATION OF HIERARCHICALLY DEFINED OBJECTS

(75) Inventor: Mike Dussault, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 1548 days.

(21) Appl. No.: 10/840,510

(22) Filed: May 6, 2004

(65) Prior Publication Data
US 2005/0256895 A1  Nov. 17, 2005

(51) Int. Cl.
*G06F 15/173* (2006.01)
*G06F 9/44* (2006.01)
*H04N 5/14* (2006.01)

(52) U.S. Cl.
USPC ............ 709/238; 717/168; 717/171; 348/700

(58) Field of Classification Search
USPC .................... 709/238; 717/168, 171; 348/700
See application file for complete search history.

(56) References Cited

U.S. PATENT DOCUMENTS

| | | | | |
|---|---|---|---|---|
| 5,228,098 A | * | 7/1993 | Crinon et al. ................. | 382/240 |
| 5,404,174 A | * | 4/1995 | Sugahara ..................... | 348/700 |
| 5,473,772 A | * | 12/1995 | Halliwell et al. .............. | 717/171 |
| 5,786,858 A | * | 7/1998 | Yagasaki et al. ......... | 375/240.15 |
| 5,917,494 A | * | 6/1999 | Arai et al. ..................... | 345/419 |
| 6,018,747 A | * | 1/2000 | Burns et al. .................... | 707/203 |
| 6,282,240 B1 | * | 8/2001 | Fukunaga et al. ........ | 375/240.01 |
| 6,374,250 B2 | * | 4/2002 | Ajtai et al. .................... | 707/101 |
| 6,438,559 B1 | | 8/2002 | White et al. | |
| 6,490,681 B1 | * | 12/2002 | Kobayashi et al. ........... | 713/171 |
| 6,507,618 B1 | * | 1/2003 | Wee et al. ................ | 375/240.16 |
| 6,535,894 B1 | * | 3/2003 | Schmidt et al. ................ | 707/204 |
| 6,651,249 B2 | * | 11/2003 | Waldin et al. ................. | 717/170 |
| 6,694,335 B1 | * | 2/2004 | Hopmann et al. ........... | 707/201 |
| 6,731,684 B1 | * | 5/2004 | Wu .......................... | 375/240.12 |
| 7,096,311 B2 | * | 8/2006 | Chiang ......................... | 711/100 |
| 7,145,566 B2 | * | 12/2006 | Karlov .......................... | 345/530 |
| 7,287,249 B2 | * | 10/2007 | Coyle et al. ................... | 717/168 |
| 7,320,009 B1 | * | 1/2008 | Srivastava et al. ......... | 707/104.1 |
| 7,755,590 B2 | * | 7/2010 | Park .............................. | 345/99 |
| 7,805,419 B2 | * | 9/2010 | Newman ....................... | 707/695 |
| 2001/0021268 A1 | * | 9/2001 | Jun et al. ....................... | 382/165 |
| 2002/0028061 A1 | * | 3/2002 | Takeuchi et al. ................ | 386/68 |
| 2002/0101536 A1 | * | 8/2002 | Cook et al. ................... | 348/453 |
| 2002/0103815 A1 | * | 8/2002 | Duvillier et al. .............. | 707/203 |
| 2003/0039308 A1 | * | 2/2003 | Wu et al. .................. | 375/240.12 |
| 2003/0078103 A1 | * | 4/2003 | LeMay et al. .................. | 463/43 |
| 2003/0114226 A1 | * | 6/2003 | Kimura .......................... | 463/42 |
| 2004/0027321 A1 | * | 2/2004 | O'Donnell ..................... | 345/87 |
| 2004/0080504 A1 | * | 4/2004 | Salesky et al. ............... | 345/418 |
| 2006/0031828 A1 | * | 2/2006 | Won et al. ..................... | 717/168 |

* cited by examiner

*Primary Examiner* — Guang Li

(74) *Attorney, Agent, or Firm* — Frommer Lawrence & Haug LLP; Jamie L. Wiegand

(57) ABSTRACT

A method and system are directed to serialization of hierarchically defined objects for communication over a network. A change associated with an object, a field within the object, and the like, may be flagged. Such flagged changes between one game frame and another frame may be included into a frame delta of changes. The frame delta data may include an object identifier, field identifier, and a value associated with the change. The frame delta data may be serialized and sent across a network, employing any of a variety of network protocols.

21 Claims, 6 Drawing Sheets

METHOD AND SYSTEM FOR SERIALIZATION OF HIERARCHICALLY DEFINED OBJECTS

FIELD OF THE INVENTION

The present invention relates generally to data access, and more particularly, to managing serialization of hierarchically defined objects over a network.

BACKGROUND OF THE INVENTION

Computer animation games are a popular form of entertainment finding widespread use in a variety of forms, including: standalone game systems, game cartridge systems connected to television sets, and game software for personal computers.

Many game systems, today, are played across multiple computers, which are connected together by a network. These systems allow multiple players sitting at individual computers, often remote from each other, to participate in, the same game. Players are able to compete against each other as well as simulated opponents that may be managed by a game server, thereby adding a new dimension to the competition. These systems, and others, may also allow many players to participate in separate games competing against a simulated opponent managed by the game server, rather than another remote player.

For their part, many of today's computer animation games are written in an object-oriented programming language using object-oriented programming techniques. In this regard, an "object" may refer to a specific programming construct (such as data hiding, containment, hierarchies, and the like) that typically defines associated data members and methods, such as an object instantiated from a C++ class, a Java class, Object Pascal class, and the like.

Such objects may be transferred during a game session across the network that may connect the game server with one or more client devices. Transferring these objects may use a process known as serialization. Serialization is the general term for the processes of taking an attribute (e.g., data) of a given object and building a stream of bits that includes that data. The stream is typically in a form that may be readily manipulated and sent over the network, using a network protocol, such as TCP, or the like. This process may also sometimes be referred to as streaming, flattening, or even more prosaically as pickling.

The determination of which objects, associated data, and the like, to serialize, as well as how to serialize the determined objects becomes important, especially in a multi-client/server environment, and especially where performance may be of paramount concern. It is thus with respect to these considerations, and others, that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE PREFERRED EMBODIMENT

The present invention is directed to addressing the above-mentioned shortcomings, disadvantages and problems, and will be understood by reading and studying the following specification.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely software embodiment or an embodiment combining software and hardware aspects. The following detailed description is, therefore, not to be taken in a limiting sense.

Briefly stated, the present invention is directed towards a method and system for determining an object and its associated data, to be transferred to a client over a network. Determination of the object may based on a variety of characteristics, including, but not limited to, an identified change associated with an object, a presence of a new object, an identified changed within a field for an object, and the like. Changes between frames (e.g., such as changes over a program loop) may be collected into a data store termed herein as a "frame delta." This frame delta may include an object identifier, field identifier, and a value associated with the change for the field. The frame delta may then be serialized (e.g., transformed into serial bits of data) and sent across a network, employing any of a variety of network protocols.

In one embodiment, the requesting client saves data for an object from a prior frame. Upon receiving the serialization frame delta, the requesting client may employ the prior frame data, together with the frame delta, to smooth a transition between the two sets of data.

Illustrative Operating Environment

Figure 1:
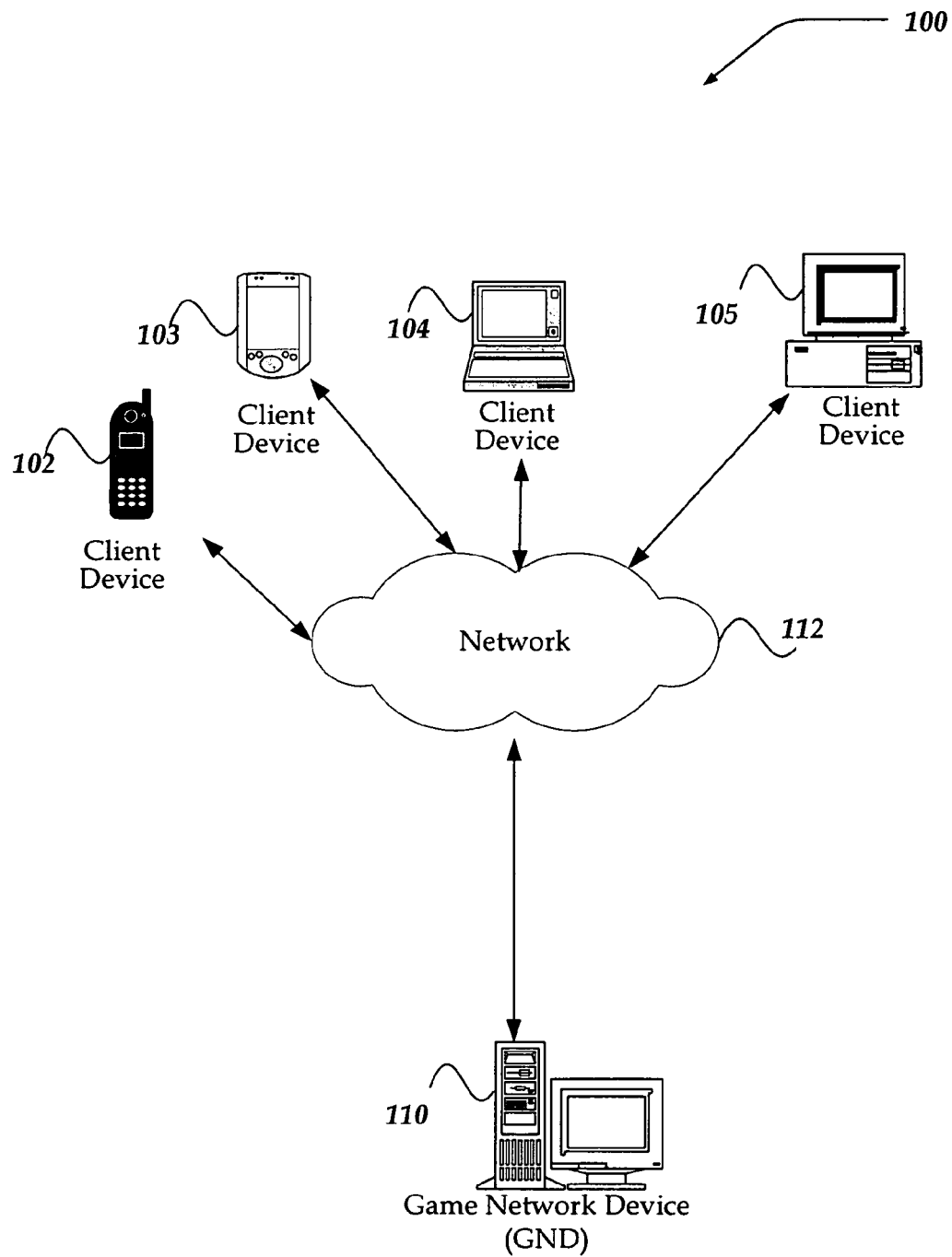
FIG. 1 illustrates one embodiment of an environment in which the invention operates.

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 102-105, network 112, and game network device (GND) 110. Network 112 enables communication between client devices 102-105, and GND 110.

Generally, client devices 102-105 may include virtually any computing device capable of connecting to another computing device to send and receive information, including game information, and other interactive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device, and the like. Similarly, client devices 102-105 may be any device that is capable of connecting using a wired or wireless communication medium such as a PDA, POCKET PC, wearable computer, and any other device that is equipped to communicate over a wired and/or wireless communication medium.

Client devices 102-105 may further include a client application, and the like, that is configured to manage the actions described above. Moreover, client devices 102-105 may also include a game client application, and the like, that is configured to enable an end-user to interact with and play a game, an interactive program, and the like. The game client may be configured to interact with a game server application, or the like. In one embodiment, the game client is configured to provide various functions, including, but not limited to, authentication, ability to enable an end-user to customize a game feature, synchronization with the game server application, and the like. The game client may further enable game inputs, such as keyboard, mouse, audio, and the like. The game client may also perform some game related computations, including, but not limited to audio, and visuals, rendering, and the like. In one embodiment, client devices 102-105 are configured to receive and store game related files, executables, audio files, graphic files, and the like. In still another embodiment, the game client may receive a frame delta associated with a change to a game object. The game client may further enable a substantially smooth transition between data associated with the game object at one frame, and data associated with the game object at another frame.

In another embodiment, a game server resides on another network device, such as GND 110. However, the invention is not so limited. For example, client devices 102-105 may also be configured to include the game server, and the like, such that the game client and game server may interact on the same client device, or even across several client devices. Furthermore, although the present invention is described employing a client/server architecture, the invention is not so limited. Thus, other computing architectures may be employed, including but not limited to peer-to-peer, and the like.

Network 112 is configured to couple client devices 102-105, and the like, with each other, and to GND 110. Network 112 is enabled to employ any form of computer readable media for communicating information from one electronic device to another. Also, network 112 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 1112 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for mobile devices, such as client device 102 with various degrees of mobility. For example, network 112 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 112 includes any communication method by which information may travel between client devices 102-105 and GND 110, and the like.

Additionally, network 112 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

GND 110 is described in more detail below in conjunction with FIG. 2. Briefly, however, GND 110 includes virtually any network device configured to include the game server program, and the like. As such, GND 110 may be implemented on a variety of computing devices including personal computers, desktop computers, multiprocessor systems, microprocessor-based devices, network PCs, servers, network appliances, and the like.

GND 110 may further provide secured communication for interactions and accounting information to speedup periodic messages between the game client and the game server, and the like. Such messages may include change data associated with an object, including, but not limited to, an object's position update, velocity update, audio update, color change, and the like.

Illustrative Server Environment

Figure 2:
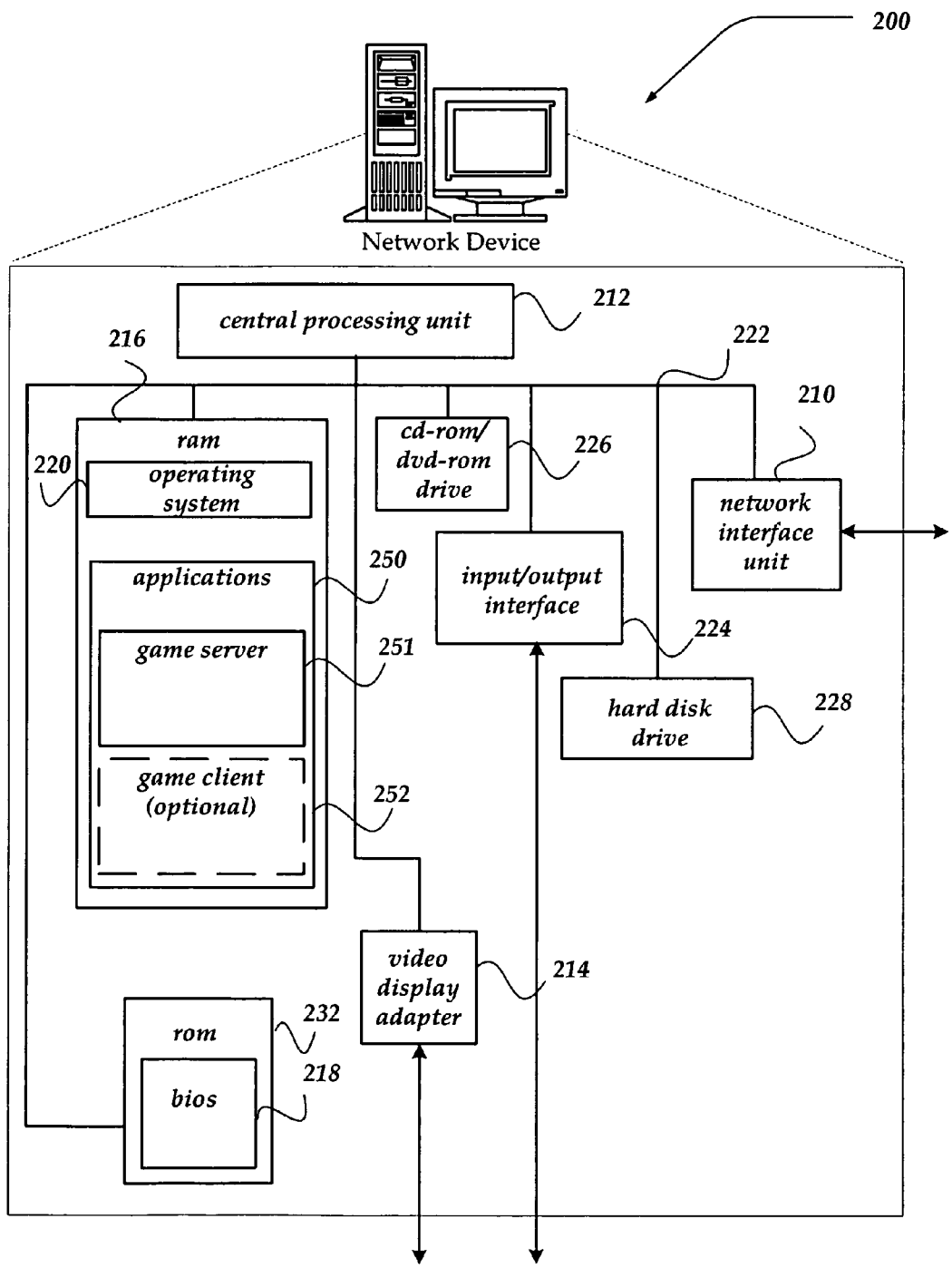
FIG. 2 illustrates a functional block diagram of one embodiment of a network device configured to operate as a game server.

FIG. 2 shows one embodiment of a network device, according to the present invention. Network device 200 may include many more components than those shown. The components shown, however, are sufficient to disclose an illustrative embodiment for practicing the invention. Network device 200 may represent, for example, GND 110 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, such as network 112 in FIG. 1, via network interface unit 210, which is constructed for use with various communication protocols including the TCP/IP protocols. For example, in one embodiment, network interface unit 210 may employ a hybrid communication scheme using both TCP and IP multicast with a client device, such as client devices 102-105 of FIG. 1. Network interface unit 210 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, graphics programs, database programs, word processing programs, HTTP programs, user interface programs, various security programs, and so forth. In one embodiment, applications 250 include optional game client 252. Mass storage may further include applications such as game server 251.

Figure 3:
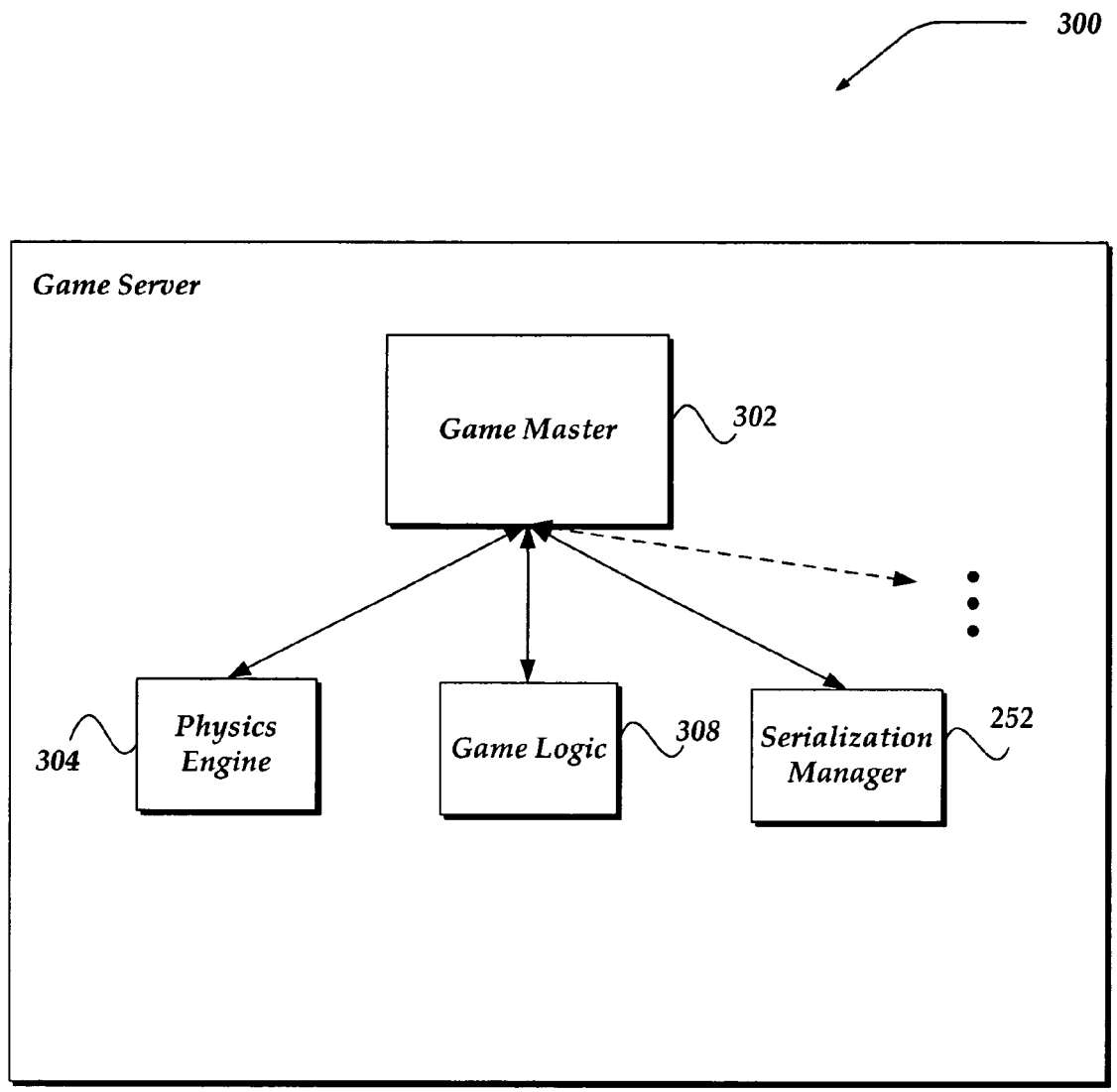
FIG. 3 illustrates a functional block diagram of one embodiment of a game server including a serialization manager.

One embodiment of game server 251 is described in more detail in conjunction with FIG. 3. Briefly, however, game server 251 is configured to enable an end-user to interact with a game, and similar three-dimensional modeling programs. In one embodiment, game server 251 interacts with a game client residing on a client device, such as client devices 102-105 of FIG. 1. In another embodiment, game server 251 interacts with game client 252 residing on network device 200. In still another embodiment, game server 251 may reside on a client device, such as client devices 102-105. Game server 251 may also interact with a client application, security application, transport application, and the like, on another device.

Network device 200 may also include an SMTP handler application for transmitting and receiving e-mail, an HTTP handler application for receiving and handling HTTP requests, and an HTTPS handler application for handling secure connections. The HTTPS handler application may initiate communication with an external application in a secure fashion. Moreover, network device 200 may further include applications that support virtually any secure connection, including but not limited to TLS, TTLS, EAP, SSL, IPSec, and the like.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, client device information, policy, security information including, but not limited to certificates, ciphers, passwords, and the like.

FIG. 3 illustrates a function block diagram of one embodiment of a game server for use in GND 110 of FIG. 1. As such, game server 300 may represent, for example, game server 251 of FIG. 2. Game server 300 may include many more components than those shown. The components shown, however, are sufficient to disclose an illustrative embodiment for practicing the invention. It is further noted that virtually any distribution of functions may be employed across and between a client device and network device, such as a server device. As shown in the figure, game server 300 includes game master 302, physics engine 304, game logic 308, and serialization manager 252.

Game master 302 may provide oversight and coordination for other applications. Game master 302 may also be configured to provide authentication, and communication services with a game client, another game server, and the like. Game master 302 may receive, for example, input events from the game client, such as keys, mouse movements, information associated with a request for an update, and the like, and provide the input events to game logic 308, physics engine 304, serialization manager 252, and the like. Game master 302 may further communicate with several game clients to enable multiple players, and the like. Game master 302 may also monitor actions associated with a game client, client device, another game server, and the like, to determine if the action is authorized. Game master 302 may also disable an input from an unauthorized sender.

Game master 302 interacts with physics engine 304, serialization manager 252, game logic 308, and the like to coordinate various aspects of animation for the game. Game master 302, physics engine 304, and game logic 308 are configured to determine a change to an object, and the like, based on a predetermined frame cycle, sometimes known as frame rate, frame time, and the like, even sometimes similarly a frame. The invention however, is not constrained to providing serialized data based on a change between frames. Virtually, any criteria may be employed to determine change data, including but not limited to, a start of a program, a save request, a terminate request, an event change such as a new client joins a game, and the like. Change data may also be determined based on an event condition within a game, and the like. Moreover, change data may be determined between virtually any set of frames, and need not based on a client frame. Thus, virtually any condition and virtually any change may be considered within the scope of the present invention.

Physics engine 304 is in communication with game master 302. Physics engine 304 is configured to provide mathematical computations for interactions, movements, forces, torques, collision detections, collisions, and the like. In one embodiment, physics engine 304 is a provided by a third party. However, the invention is not so limited and virtually any physics engine 304 may be employed that is configured to determine properties of entities, and a relationship between the entities and environments related to the laws of physics as abstracted for a virtual environment.

Game logic 308 is also in communication with game master 302, and is configured to provide game rules, goals, and the like. Game logic 308 may include a definition of a game logic entity within the game, such as an avatar, vehicle, and the like. Game logic 308 may include rules, goals, and the like, associated with how the game logic entity may move, interact, appear, and the like, as well. Game logic 308 may further include information about the environment, and the like, in which the game logic entity may interact.

Figure 4:
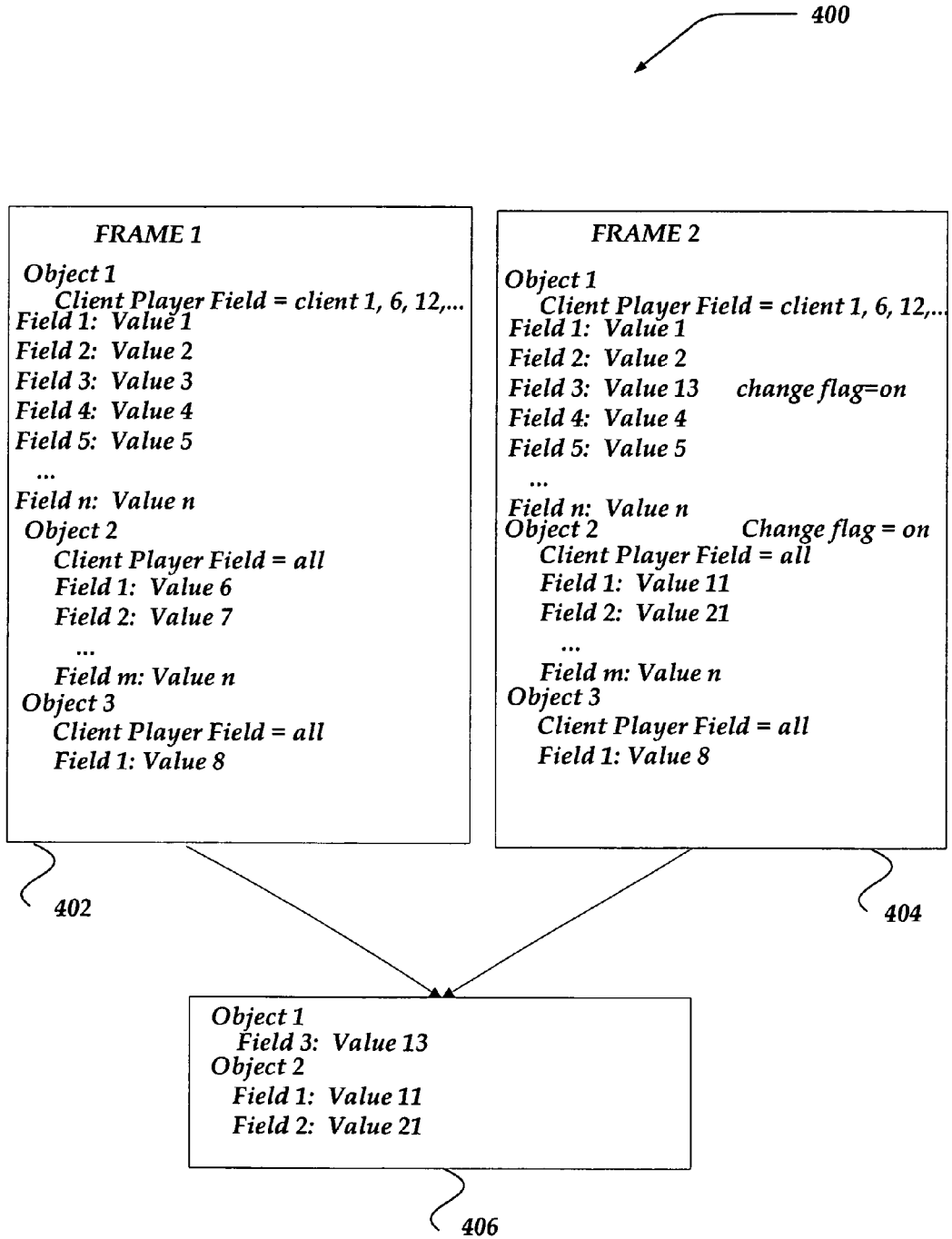
FIG. 4 illustrates one embodiment of a frame structure for managing change in an object.

Serialization manager 252 is in communication with game master 302. Serialization manager 252 may receive a request to provide change data associated with an object for a given frame, change data for a set of objects between one or more frames, and the like. FIG. 4 illustrates one embodiment of a sample of change data associated with a frame for various objects.

Serialization manager 252 may interact with other modules within game server 300, to determine a change data associated with the object. The determined change may be stored in a data store known as frame delta, such as illustrated in FIG. 4.

In one embodiment, the frame delta may represent change data that enables a client to transition from one frame configuration to another frame configuration associated with the game, or the like. Serialization manager 252 may further serialize the frame delta and provide the serialization data to the client. Serialization manager 252 may employ a process substantially similar to processes described below in conjunction with FIGS. 5-6.

FIG. 4 illustrates one embodiment of a frame structure for managing change in an object. Change structure 400 of FIG. 4 may include many more components than those shown. The components shown, however, are sufficient to disclose an illustrative embodiment for practicing the invention. It is further noted that virtually any distribution of object data, change data, and the like, may be employed. For example, objects may be described as C++ class structures, Java classes, and the like, without departing from the scope or spirit of the invention. It is further noted, that although objects are employed in the description of the invention, the invention is not so constrained. That is, virtually any programming construct may be employed to manage change data, without departing from the scope or spirit of the invention.

As illustrated, change structure 400 includes frame data snapshot 402, frame data snapshot 404, and frame delta 406. Frame data snapshot 402, frame data snapshot 404, and frame delta 406 may be implemented as a program structure, a class, a data file, database, table, and the like.

Generally, as the game server goes along, it takes a "frame data snapshot" which records a current state of the substantially all the objects and their fields, typically at an end of that frame, along with information indicating which objects/fields have changed between a prior frame snapshot and the current frame. One or more clients may be connected to the game server and, due to latency, packet loss, and the like, the game server may maintain a data store, per client, of which "frame data snapshot" the client has most recently acknowledged. The game server then may employ this information to create frame delta 406, which represents a delta between two frame snapshots. This delta may then be serialized to a network stream and sent to the client to allow it to recreate the data embodied in frame data snapshot 404 (i.e., the most recent data).

Thus, as shown, frame data snapshots 402 and 404 include object data for frame 1 and frame 2, respectively. Frame data snapshot 402 illustrates a set of objects 1-3. Each object within frame data snapshot 402 further includes at least one field with an associated value for that field. Each object further includes a client player field indicating to which client(s) an object is to be provided. As an example, object 1 of frame data snapshot 402 includes a client player field indicating that object 1 is available for at least clients 1, 6, and 12. Object 1 includes fields 1-n with associated values 1-n. It is noted an object need not include the same number and/or type of fields as another object.

An object may represent any of a variety of objects in the game structure. For example, an object may represent a chair, an avatar, a vehicle, a staircase, a door, a monster, an AI controlled character, a projectile, and the like. As such, a field may represent a feature, action, result, and the like, associated with the object. For example, field 1 may represent a position for object 1, while field 2 may represent a velocity, color, or the like.

Objects may be defined hierarchically. An object may represent an object derived from a base object. In one embodiment, an object described within frame data snapshots 402 and 404 may include data based on a flattened hierarchical object. That is, the fields include fields associated with a base object from which the object may be derived, such as a parent object, and the like, as well the objects 'own' fields.

Frame data snapshot 404 illustrates objects 1-3. Although not illustrated, an object may be identified in one frame data set (frame data snapshots 402 and 404) but may be missing from another. This may arise, for example, when an object is first created, destroyed, and the like and the creation or destruction is implicit when comparing the two snapshots.

As illustrated in frame data snapshot 404, an object may include a change flag indicating that a field within the object has changed from a prior frame. An object may also include another change flag to indicate that the object has changed from the prior frame. In one embodiment, the object-level change flag may be employed to indicate that something within the object has changed, without necessarily indicating what has changed. Change flags may be employed to expedite searches for changes within a frame, for at least the creation of a delta of change data between frames (e.g., frame delta 406).

Although not illustrated, in another embodiment, an object may have associated with it a change number. The change number may then be compared between frames to determine a change for that object.

As an example, object 1, field 3 of frame data snapshot 404, includes a field-level change flag. The value associated with field 3 is 13 rather than 3 as shown in frame data snapshot 402 for object 1. Object 2 includes an object-level change flag. This indicates that at least one field has changed, but does not indicate which field. It is apparent that the change flags are not exclusive, and may be employed on both the object-level and the field-level. A change flag may even be employed to indicate that the client player field has changed.

Frame delta 406 represents extracted change data based in part on a comparison between frame data snapshots 402 and 404. For example, as shown in the figure, frame delta 406 includes all the fields of object 2 because object 2 of frame data snapshot 404 included an object-level change flag. The invention however, is not so limited. For example, the invention may observe the object-level change flag and perform a search for only the fields that changed within the 'flagged' object. In this manner, then further compression of data may be obtained by only providing changed data to a client. As object 3 did not indicate a change between frame data snapshots 402 and 404, it is not included in frame delta 406.

As shown, frame delta 406 includes the changed value (e.g., the new value) associated with a field. For example, the value 13 is shown for field 3 of object 1. However, the invention is not constrained to merely the changed value. For example, a delta value may also be determined that represents a difference between values of a field from frame data snapshot 402 and the same field in frame data snapshot 404.

Although not illustrated, fields within an object may further be designated with an exclusion flag. The exclusion flag may be employed to identify a field that is to be excluded in the frame delta. For example, in one embodiment, for a hierarchical object, a derived object, and the like, a field associated with a parent, a base object from which the object is derived, and the like, may be flagged for exclusion from a snapshot of changes. In this manner, further compression may be obtained for data to be sent to a client.

Although only two frame data sets have been illustrated, additional frames may exist. Moreover, an update to a client may include transitioning the client over several frames, such as from frame 1 to frame 5, for example. In one embodiment, frame delta 406 may include changes between successive frames, such as between frames 1 and 2, frames 2 and 3, frames 3 and 4, and frames 4 and 5. In another embodiment, however, frame delta 406 may include change data between values in frame 1 and frame 5. Moreover, the invention may encompass virtually any other combination of frame transitions, without departing from the scope or spirit of the invention.

Generalized Operation

Figure 5:
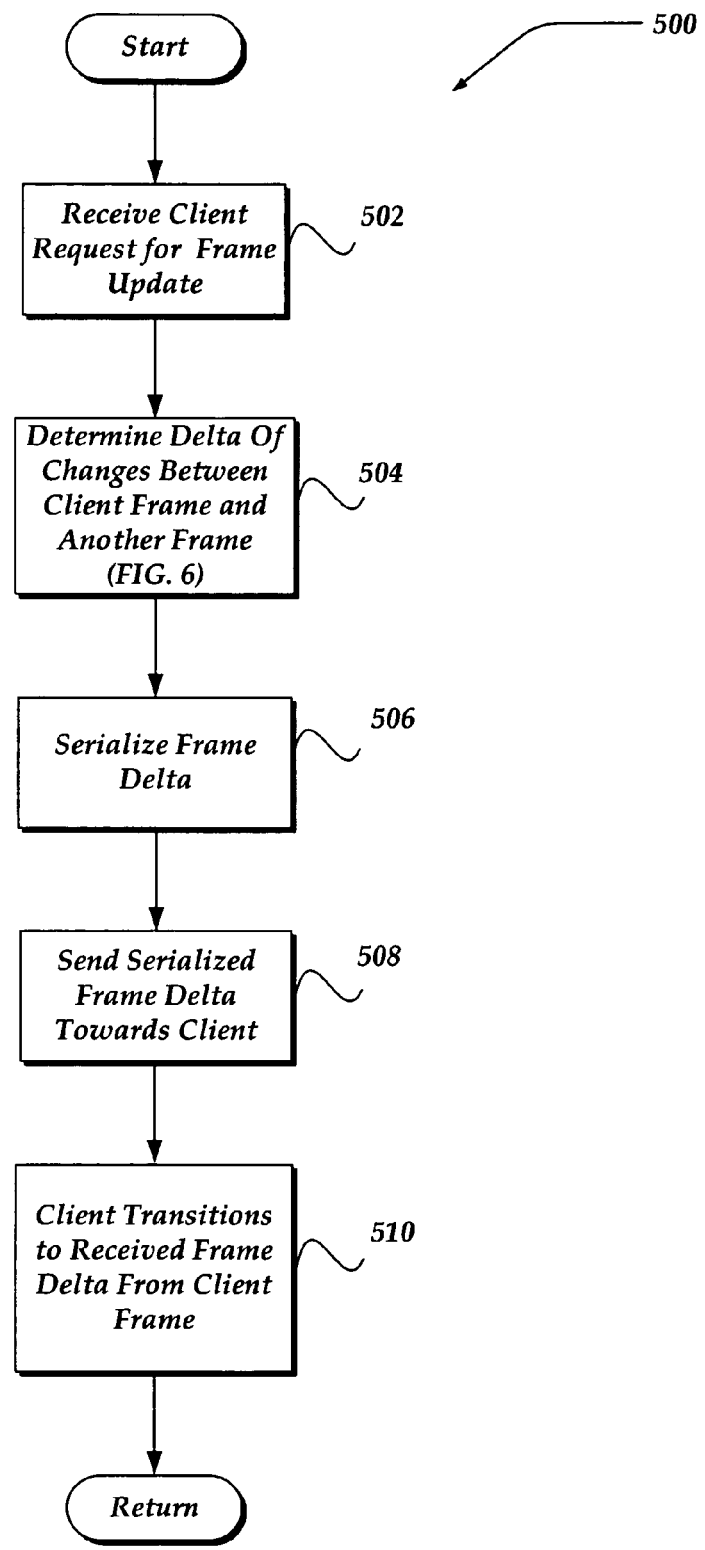
FIG. 5 illustrates a flow diagram generally showing one embodiment of a process of managing serialization of hierarchically defined objects over the network.

The operation of certain aspects of the present invention will now be described with respect to FIGS. 5-6. Briefly, FIG. 5 illustrates a flow diagram generally showing one embodiment of a process of managing serialization of hierarchically defined objects over the network, in accordance with the invention. Process 500 may be implemented, for example, within GND 110 of FIG. 1.

Process 500 begins, after a start block, at block 502, where a client request for a frame update is received. As stated above, the invention is not limited to frame updates, nor is it limited to waiting for a request from a client to provide an update. For example, in one embodiment, the invention may maintain a table, file, database, or the like, that indicates what information was last provided to the client. The process may then employ the information to determine which frame the client was last provided. The process may then loop through a set of clients and determine which frame a client may have last received, and to which frame the client is to be updated. In one embodiment, a counter may be employed that determines when the set of clients have received updates associated with a given object, a given frame, and the like. Once it is determined that the set of clients have been updated past a particular frame, that frame and object data associated with that frame may be released.

Process 500 proceeds next to block 504. Block 504 is described in more detail below in conjunction with FIG. 6. Briefly, however, at block 504, a frame delta of change data between the client frame of block 504 and another frame is determined. In one embodiment, the other frame may represent a current frame associated with a game server, such as game server 251 of FIG. 2.

Upon completion of block 504, processing proceeds to block 506, where the frame delta is serialized. At block 504, the information to be serialized may include an identifier associated with the changed object, an identifier associated with the changed field, and, in one embodiment, the changed value for the changed field. The identifier for the field may be represented as an index, in one embodiment.

For example, an index associated with field 3 may be represented by three bits of data. Field 3 might be, in the example, a floating-point field of five bits. Based on this example, the data to be serialized may include three bits, representing the field 3 index, followed by five bits representing the value 13.

Serialization may further include any of a variety of mechanisms that converts the bytes of data within snapshot data into a serial bit stream. For example, assuming objects and fields within them are sequentially numbered, one format for serialization would be to write to a network buffer the object number identifier, field identifier, and field value for each serialized change. Processing next moves to block 508 where the serialized bit stream is sent towards the client. The data may be sent employing any of a variety of networking protocols, including TCP/IP, UDP/IP, and the like.

Processing continues to block 510, where the client receives the serialized data. In one embodiment, the client saves the prior frame data. The client may then employ the saved frame data to transition smoothly between the saved data to the frame delta data. Upon completion of block 510, the process may return to a calling process to perform other actions.

Figure 6:
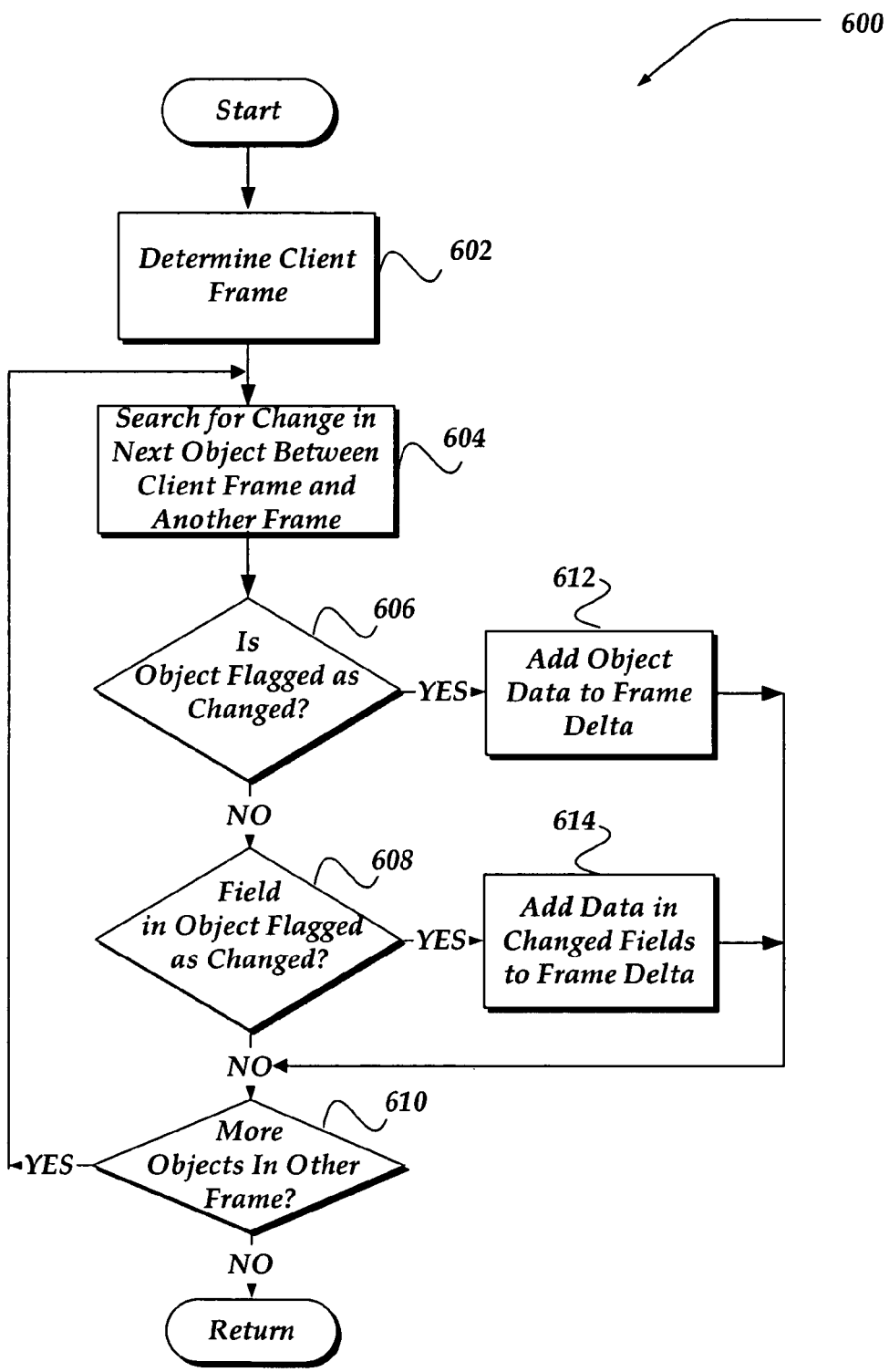
FIG. 6 illustrates a flow diagram showing one embodiment of a process for determining a snapshot of changes between a client frame and another frame, in accordance with the invention.

FIG. 6 illustrates a flow diagram showing one embodiment of a process for determining a frame delta of changes between a client frame and another frame. Process 600 of FIG. 6 may be executed from block 504 of FIG. 5.

Process 600 begins, after a start block, at block 602, where a client frame is determined. In one embodiment, the client frame is provided to block 602 from information obtained at block 502 of FIG. 5.

Processing continues to block 604, where a search is performed for a change in the next object between the client frame and another frame. In a first entry of block 604, the next object may be a first object in the other frame. In one embodiment, the other frame is a current frame associated with a game server. However, the invention is not so constrained, and the other frame may be based on virtually any other criteria, events, inputs, and conditions. In any event, at block 604, change flags may be employed at an object level, and/or at a field level to identify a change. By searching for change flag status, minimal computations may be employed.

Processing proceeds to decision block 606, where a determination is made whether the changed object is flagged at an object-level change. If the changed object is flagged at the object-level, processing branches to block 612; otherwise, processing continues to decision block 608.

At block 612, the data object and its associated fields are added to a frame delta of changes. In one embodiment, only the fields that changed may be included. In another embodiment, every field associated with the object is added. In still another embodiment, a field may be designated for exclusion from the frame delta. In any event, upon adding the appropriate object data to the frame delta, processing proceeds to decision block 610.

At decision block 608, a determination is made whether a field within an object is changed. A field may be identified as changed based on a field-level change flag. If it is determined that a field has changed, processing proceeds to block 614; otherwise, processing flows to decision block 610.

At block 614, the changed field is added to the frame delta. If the changed field is flagged for exclusion, it may not be added, however, to the frame delta. In any event, upon addition of the non-excluded changed fields, processing moves to decision block 610.

At decision block 610, a determination is made whether another object is to be examined between the client frame and the other frame. If another object is to be examined processing loops back to block 604, and continues until no more objects are to be examined. When no more objects are to be examined, processing returns to process 500 of FIG. 5, to perform other actions.

Although the present invention is described in the context of a game, the invention is not so limited. For example, the present invention may be applicable to virtually any interactive program that employs a logic program and a physics engine that may provide differing results for a given entity.

It will be understood that each block of the flowchart illustration, and combinations of blocks in the flowchart illustration of FIG. 6, may be implemented by a combination of hardware-based systems and software instructions. The software instructions may be executed by a processor to cause a series of operational steps to be performed by the processor to produce a computer-implemented process such that the instructions, which execute on the processor, provide steps for implementing some or all of the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The various embodiments have been described above in light of certain mathematical relationships. A person skilled in the art would note that these mathematical relationships are subject to many possible computer implementations, which are all within the scope of the invention. Furthermore, it should be noted that the language of mathematics allows many ways to convey the same relationship. All such variations of the above described equations and relationships are naturally within the scope of the invention.

The above specification, examples, and data provide illustrative embodiments of the present invention. Since many embodiments of the invention can be made without departing from the spirit and scope of the invention, the invention resides in the claims hereinafter appended.

I claim:

1. A method of managing an update over a network, comprising:
    searching a current frame snapshot of a current state of a plurality of objects for at least one change flag in the current frame snapshot, wherein the at least one change flag within the current frame snapshot identifies which object in the plurality of objects in the current frame snapshot is changed between a previous frame snapshot and the current frame snapshot such that a presence of the at least one change flag in the current frame snapshot indicates the object in the current frame snapshot is changed;
    searching a last frame snapshot associated with a client device for at least another change flag in the last frame snapshot, wherein the at least another change flag within the last frame snapshot identifies that the object has another change between the last frame snapshot and another previous frame snapshot associated with the client device such that a presence of the at least another change flag in the last frame snapshot indicates that the object has another change;
    employing the change flag and the other change flag to identify the changed object such that the identified changes are extracted to generate a delta of changes of the object based on:
        when the change flag or the other change flag indicates an object-level change, extracting data for each non-excluded field for the object, and
        when the change flag or the other change flag indicates a field-level change, and when a field indicated by the change flag or the other change flag is a non-excluded field, extracting data for the non-excluded field; and
    creating a frame delta having at least the delta of changes identified using at least the change flag and the other change flag; and
    sending the frame delta to the client device over the network.

2. The method of claim 1, wherein the change flag further identifies a field-level change within the object and wherein the frame delta is created from less than the entire object and includes the identified field-level change of the object.

3. The method of claim 1, further comprising:
    receiving at the client device the frame delta; and
    employing the frame delta to transition from the last frame snapshot to the current frame snapshot.

4. The method of claim 1, wherein the determined change in the frame delta represents at least one of an object identifier, a field identifier, or a value associated with a field for the object.

5. The method of claim 1, wherein the change in the object further comprises a field change in the object.

6. The method of claim 1, wherein another change in the object is excluded from inclusion in the frame delta.

7. The method of claim 6, wherein the exclusion from within the frame delta is determined based, at least on an exclusion flag associated with another field associated with the other change.

8. The method of claim 1, further comprising, receiving a request for the update from the client device.

9. The method of claim 1, wherein the change further comprises at least one of a new value associated with the object in the current frame, and a delta value between a first value in the previous frame and a second value in the current frame.

10. The method of claim 1, wherein the object represents a hierarchically defined object.

11. A network device for managing a change over a network, comprising:
    a transceiver for receiving data from a client and for sending the change to the client; and
    a serialization manager that is configured to perform actions, including:
        searching a frame data snapshot to locate at least one change flag within the frame data snapshot indicating a change to an object in the frame data snapshot, wherein a presence of the at least one change flag in the frame data snapshot indicates the object in the frame data snapshot is changed;
        determining another frame data snapshot associated with the client;
        employing the located change of the object to generate a frame delta of changes of the object between the frame data snapshot and the other frame data snapshot based on:
            when the change flag indicates an object-level change, extracting data for each non-excluded field for the object, and
            when the change flag indicates a field-level change, and when a field indicated by the change flag is a non-excluded field, extracting data for the non-excluded field; and
        serializing the frame delta; and providing the serialized frame delta to the client over the network.

12. The network device of claim 11, wherein the client is configured to perform actions, including:
saving data associated with object;
receiving the serialized frame delta;
extracting the change associated with the object from the serialized frame delta; and
transitioning a configuration of the object based at least on the saved data and the extracted change associated with the object.

13. The network device of claim 11, wherein the frame delta represents changes of at least one of an object identifier, a field identifier, or a value associated with a field for the object.

14. The network device of claim 11, wherein providing the serialized frame delta to the client further comprises determining if the client is to receive the frame delta based on a client player field.

15. The network device of claim 11, wherein the at least one change flag indicates a change in a configuration of the object at a first frame and another configuration of the object at a second frame.

16. The network device of claim 11, wherein the frame delta further comprises at least one of a new value associated with the object at a second frame, and a delta value between a first value in a first frame and a second value at a second frame.

17. The network device of claim 11, wherein the change flag further comprises at least on of an object-level change flag of a field-level change flag.

18. The network device of claim 11, wherein the frame delta further comprises at least one of an object identifier, a field identifier, or a value associated with a field for an object.

19. A non-transitory, processor readable storage medium that includes data and instructions, wherein the execution of the instructions on a computing device provides for managing an update of an object, performing actions comprising:
searching for a change flag in a frame data snapshot to locate a change for the object in the frame data snapshot between a first frame and a second frame, wherein a presence of the change flag in the frame data snapshot indicates that the object in the frame data snapshot is changed, and wherein the change flag is not part of the changed object, the change for the object being determined by:
when the change flag indicates an object-level change, extracting data for each non-excluded field for the object, and
when the change flag indicates a field-level change, and when a field indicated by the change flag is a non-excluded field, extracting data for the non-excluded field; and
sending the change and information associated with the object to a frame delta;
serializing the frame delta; and
sending the serialized frame delta over the network.

20. The non-transitory, processor readable storage medium of claim 19, further comprising,
receiving information from a game client indicating that the game client has received information associated with the first frame for the object;
enabling the game client to employ the serialized frame delta to transition from the first frame to the second frame.

21. The non-transitory, processor readable storage medium of claim 19, wherein the change flag indicates at least one of an object-level change and a field-level change.

* * * * *